United States Patent [19]
Donaldson et al.

[11] Patent Number: 5,313,589
[45] Date of Patent: May 17, 1994

[54] LOW LEVEL DEVICE INTERFACE FOR DIRECT ACCESS STORAGE DEVICE INCLUDING MINIMUM FUNCTIONS AND ENABLING HIGH DATA RATE PERFORMANCE

[75] Inventors: James E. Donaldson; Gregory G. Floryance; Steven A. Schmitt, all of Rochester, Minn.

[73] Assignee: IBM Corporation, Rochester, Minn.

[21] Appl. No.: 31,285

[22] Filed: Mar. 12, 1993

Related U.S. Application Data

[63] Continuation of Ser. No. 700,658, May 15, 1991, abandoned.

[51] Int. Cl.$^5$ .............................................. G06F 13/38
[52] U.S. Cl. .................................. 395/275; 395/425; 364/239.9; 364/238.3; 364/248.1; 364/236.2; 364/284; 364/284.2; 364/DIG. 1
[58] Field of Search ............... 395/275, 250, 425, 325, 395/700; 340/825.08, 825.06; 370/85.6; 360/40; 369/47

[56] References Cited

U.S. PATENT DOCUMENTS

| | | | |
|---|---|---|---|
| 3,503,058 | 3/1970 | Ault et al. | 360/73.02 |
| 3,576,539 | 4/1971 | Huber | 235/380 |
| 3,789,159 | 1/1974 | Feit et al. | 360/13 |
| 3,893,178 | 7/1975 | Sordello | 360/73.02 |
| 4,228,499 | 10/1980 | Springolo et al. | 364/200 |
| 4,281,315 | 7/1991 | Bauer et al. | 340/825.08 |
| 4,390,967 | 6/1983 | Eglowstein et al. | 364/900 |
| 4,410,961 | 10/1983 | Dlugos et al. | 364/900 |
| 4,534,013 | 8/1985 | Sheth | 364/900 |
| 4,907,105 | 3/1990 | Kurzweil, Jr. | 360/73.02 |
| 4,965,801 | 10/1990 | Dulac | 370/40.1 |
| 5,058,110 | 10/1991 | Beach et al. | 370/85.6 |
| 5,060,139 | 10/1991 | Theus | 364/200 |
| 5,070,477 | 12/1991 | Latif et al. | 395/325 |
| 5,097,439 | 3/1992 | Patriquin et al. | 395/425 |
| 5,107,456 | 4/1992 | Schuur | 395/325 |
| 5,150,399 | 9/1992 | Yasuda | 379/67 |

Primary Examiner—Gopal C. Ray
Attorney, Agent, or Firm—Joan Pennington; Richard E. Billion; Pryor A. Garnett

[57] ABSTRACT

A controller device interfacing method and a low level device interface are provided for use between at least one controller and a plurality of devices in a direct access storage device. Message and command and data information are received and transmitted between the controller and the device. Responsive to a received predetermined read data command, read data function hardware transmits the requested data to the controller. Responsive to a received predetermined write data command, write data function hardware writes the received data from the controller to a device. Received message information is blocked from received data information so that message information is transmitted at any time within and between data information transmissions. The low level device interface supports two wire serial data transfer and provides improved data rate performance.

11 Claims, 5 Drawing Sheets

SINGLE CHANNEL CONTROLLER WITH 8 SWITCHED DEVICES

DUAL FOUR CHANNEL CONTROLLERS WITH REDUNDANCY AND TRAY SWITCHES

Fig. 3

LOW LEVEL DEVICE INTERFACE FOR DIRECT ACCESS STORAGE DEVICE INCLUDING MINIMUM FUNCTIONS AND ENABLING HIGH DATA RATE PERFORMANCE

This application is a continuation of application Ser. No. 07/700,658, filed May 15, 1991, now abandoned.

FIELD OF THE INVENTION

The invention relates generally to controller/device interfacing methods and low level interface apparatus, and more particularly to a controller/device interfacing method and a low level device interface (LLDI) for direct access storage devices (DASD's).

DESCRIPTION OF THE PRIOR ART

Various known interface arrangements, such as an enhanced small device interface (ESDI) and an intelligent peripheral interface level 2 (IPI-2) are used between functional units in DASD subsystems. Disadvantages of the ESDI include the data rate limitation of 3 MByte/sec, cable limitations and reliability, availability and serviceability (RAS) concerns over real time signals. Traditionally, ST-506 and ESDI have separate data (20 wire) and control (34 wire) cables containing real-time signals (Read Gate, Write Gate, Clocks) which reduce reliability. IPI-2 requires a single 50 wire cable and defines a state machine which eliminates many real-time signals but requires real-time state control signals. The IPI-2 remains cost prohibitive for many applications and cannot efficiently support serialization.

In computer systems including small form factor DASD devices with disk diameters of less than $3\frac{1}{2}$ inches, a packaging problem for interface connectors and electrical components is created. The small form factor encourages packaging of multiple devices in a cluster or array which creates a cabling problem for multi-signal interfaces. None of the traditional interfaces support two wire serialization.

High level interfaces, such as SCSI, including a high performance microprocessor CPU and buffer memory, result in a higher cost. Due to the complexity of the microcode, the required development time and testing of a high level interface increases. A high level interface has increased performance overhead particularly when multiple buffers exist between the CPU and the device. Typically, high level interfaces lack specific device control needed by DASD subsystems to optimize performance.

As reduced device form factor, array applications and serial technology advance, a need for an improved low level device interface exists.

SUMMARY OF THE INVENTION

Important objects of the present invention are to provide an improved controller/device interfacing method and low level device interface (LLDI) for direct access storage devices (DASD's); to provide an interfacing method and LLDI in which increased data rate performance is enabled; to provide an interfacing method and LLDI in which two wire serialization is supported; to provide a LLDI that is relatively inexpensive to make and that is a minimum function device for permitting a wide range of applications; and to provide an interfacing method and LLDI overcoming many of the disadvantages of those used in the past.

In brief, the objects and advantages of the present invention are achieved by a controller/device interfacing method and a low level device interface used between at least one controller and a plurality of devices in a direct access storage device. Message and command and data information are received and transmitted between the controller and the device. Responsive to a received predetermined read data command, read data function hardware transmits the requested data from a device to the controller. Responsive to a received predetermined write data command, write data function hardware writes the received data from the controller to a device. Received message information is blocked from received data information so that message information is transmitted at any time within and between data information transmissions.

In accordance with features of the invention, the low level device interface supports two wire serial data transfer and provides improved data rate performance.

BRIEF DESCRIPTION OF THE DRAWING

The present invention together with the above and other objects and advantages may best be understood from the following detailed description of the embodiment of the invention illustrated in the drawings, wherein:

FIG. 8 illustrates exemplary microprocessor function hardware of the low level device interface (LLDI) of FIG. 3.

DETAILED DESCRIPTION OF THE PREFERRED EMBODIMENT

Figure 1A:
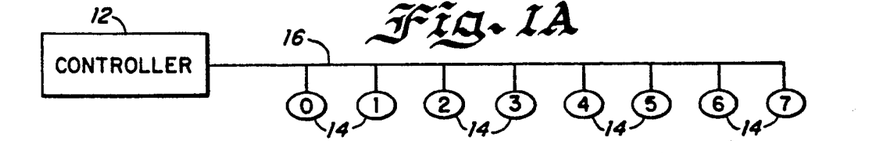
FIGS. 1A and 1B illustrate multiplexed bus controller device configurations for use with a controller/device interfacing method and a low level device interface (LLDI) of the present invention.
Figure 1B:
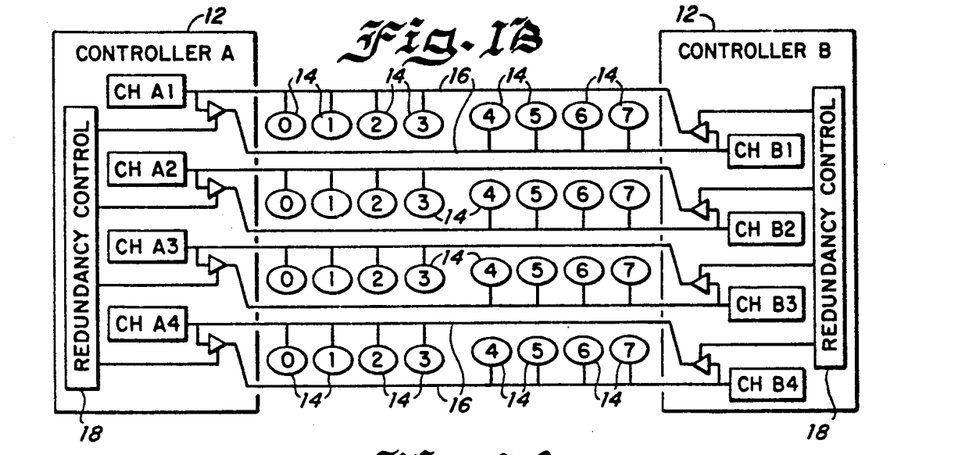
Figure 2A:
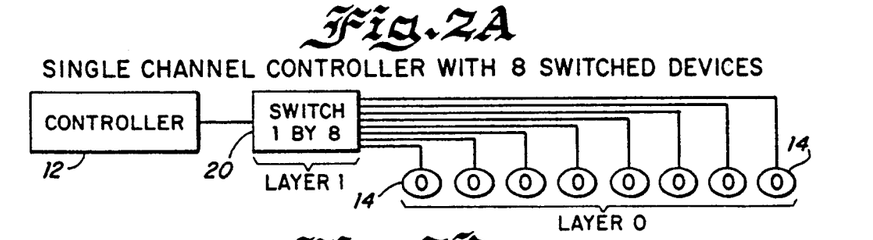
FIGS. 2A and 2B illustrate switched path bus controller/device configurations for use with a controller/device interfacing method and a low level device interface (LLDI) of the present invention.
Figure 2B:
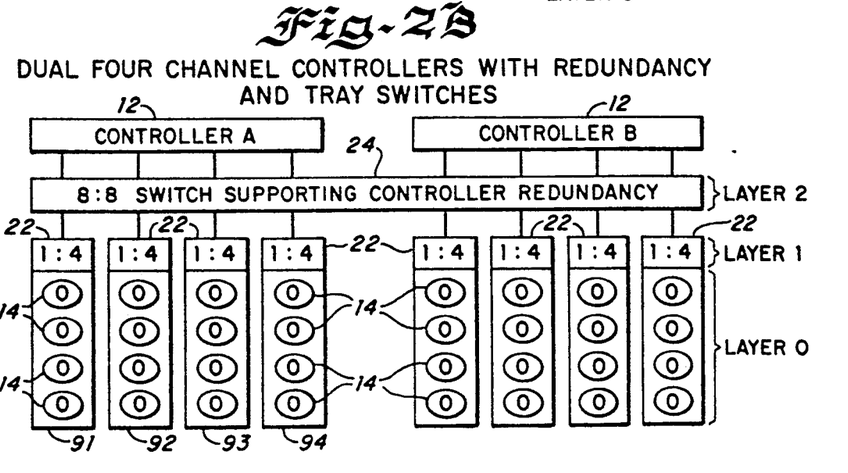
Figure 3:
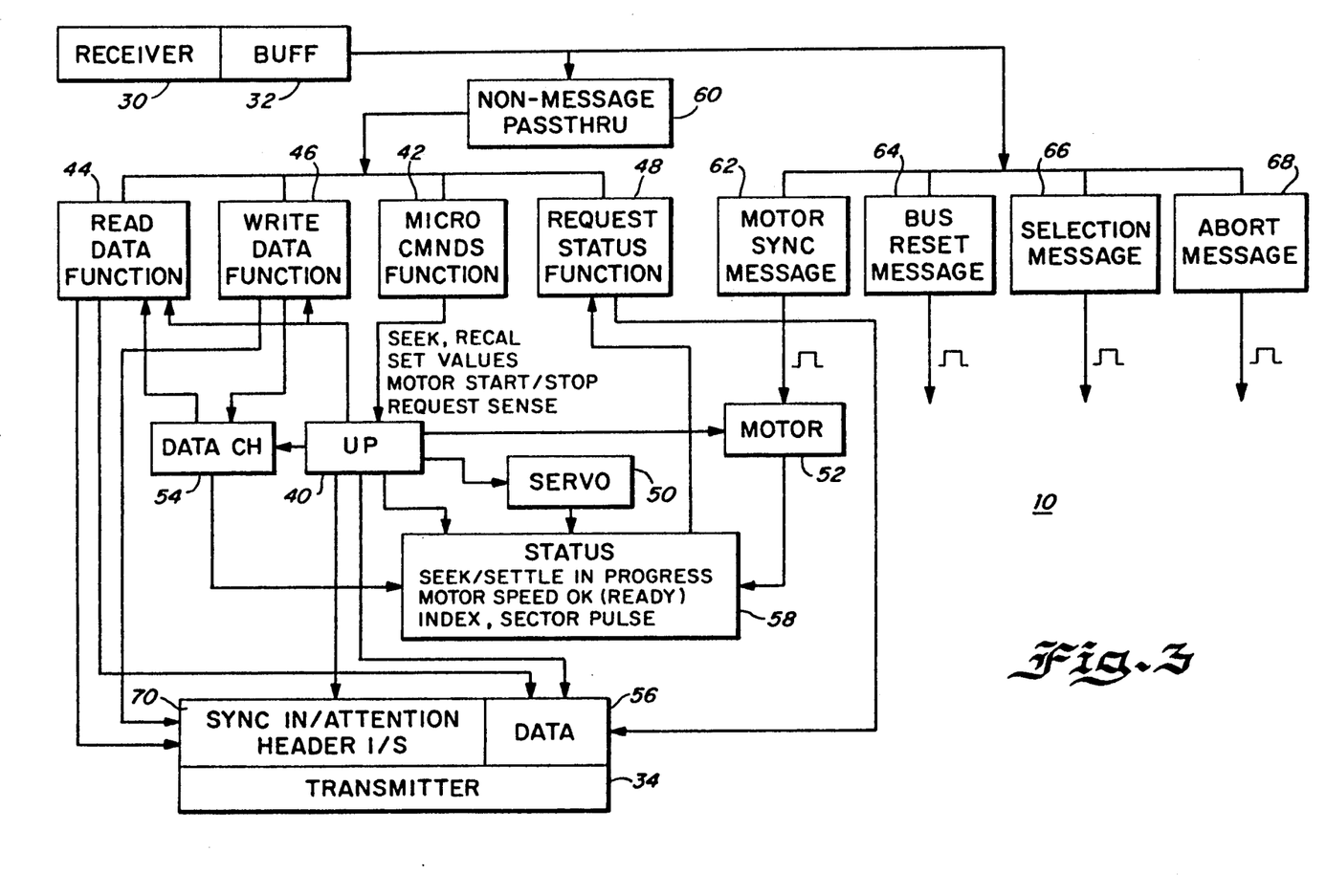
FIG. 3 is a block diagram representation of a low level device interface (LLDI) of the present invention.

Referring now to FIGS. 1A, 1B, 2A and 2B, there are shown examples of multiplied and switched path bus configurations supported by a low level device interface (LLDI) of the invention generally designated as 10 in FIG. 3. LLDI 10 supports device addressing permitting multiple devices on a single multi-drop cable to facilitate inexpensive connectivity for low-end applications and permitting multiple devices on switched path bus configuration for fast controller access to devices through the switch network. LLDI 10 supports point-to-point and layered addressing to control multiple layers of point-to-point paths. Path control can be accomplished using either a static or dynamic switch.

In FIG. 1A, there is shown a single channel controller 12 connected to multiple devices 14 by a multi-drop bus 16. Each device 14 has a different device address for logical addressing by the controller 14. FIG. 1B illustrates multiple channel multiplexed bus operation using dual four channel controllers A and B. As shown, a controller channel to device ratio of 1:4 is provided with four devices 14 normally attached to each bus 16. Redundancy control 18 supports controller redundancy for high availability. If the controller A is disabled, the functional controller B attaches the corresponding devices 0-3 to the multi-drop bus 16 with devices 4-7. Conventionally a multi-drop bus is used with a clocked parallel interface; however, both copper and optical technologies support a two wire serial multi-drop for LLDI 10.

In FIG. 2A, a single channel controller 12 is connected to eight devices 14 through a 1:8 switch 20. FIG. 2B illustrates a multi-layer switched bus path configuration with dual four channel controllers A and B. Each controller channel is connected to four layer-0 devices 14 through a layer-1 1:4 switch 22 and a layer-2 8:8 switch 24. Layer-2 8:8 switch 24 supports controller redundancy. Each layer is assigned a unique address and addressing is provided for the switched path bus in a layered fashion. Switches 20, 22 and 24 can be separately provided or integrated into the controller 12 or a device tray. An example of several trays is shown in FIG. 2B. Trays 91, 92, 93, and 94 are shown in FIG. 2B. Each tray contains a number of devices, such as disk drives, and the related electronics to support the devices and to act as an interface with another device. A Redundant Array of Inexpensive Disks (RAID) is formed from one device in each of the trays 91, 92, 93, and 94. For example, the top device 14 in each of the trays 91, 92, 93, and 94 is used to form a level 3, level 4, or level 5 RAID as defined in a paper presented at the ACM SIGMOND Conference, Jun. 1-3, 1988, in Chicago, Ill. entitled "A Case for Redundant Arrays of Inexpensive Disks (RAID)," by David A. Patterson, Garth Gibson, and Randy H. Katz.

Advantageously, the RAID formed can be serviced without interrupting the RAID formed. For example, tray 94 can be concurrently serviced leaving three devices in the RAID. The three devices in the RAID function in a somewhat degraded mode during servicing. When servicing is complete, the tray 94 is replaced forming a full function RAID.

Referring to FIG. 3, there is illustrated a block diagram representation of LLDI 10 for transferring information between controllers 12 and devices 14 of the multiplexed configurations of FIGS. 1A and 1B and the switched path configurations of FIGS. 2A and 2B. Message and data information is transferred using information bytes called novets. Each novet includes a predetermined number of bits, for example, such as nine bits with a control bit and eight bit data octet. A level zero control bit indicates data information and a level one indicates message information.

As shown in FIG. 3, LLDI 10 is configured to support device level control over a two wire serialization or optical serial bus interface. LLDI 10 includes a receiver block 30 for deserializing information received by the device. A receiver buffer 32 is a single byte first-in-first-out (FIFO) buffer for latching the received data. A transmitter block 34 serializes data or messages, such as sync in, attention, which are transmitted to the controller 12. Although LLDI 10 supports two wire serialization of the interface, serialization is not a requirement. Where no advantage from serialization is gained, for example, such as, for an embedded SCSI controller which does not have a cable or a physically large device which has the packaging area available to mount large connectors, a parallel configured LLDI 10 would not include the receiver block 30 and the transmitter block 34. The parallel cable option eliminates the cost of the serialization logic. The physical transport mechanism, whether serial or parallel, has no affect upon the protocol, messages or commands being transmitted over the LLDI 10, so that the choice of the physical interface becomes one of application requirements.

LLDI 10 performs high performance data read, write and status functions; low performance seek, motor, error reporting, mode parameter functions; programmable data block size and sector format; multiple block operations and motor synchronization.

LLDI 10 defines physical block addressing and simplifies the controller design by eliminating the need for dedicated timing critical control between the controller and the device.

Motor synchronization is required for performance in array applications. Conventional standard interfaces require a separate cable to broadcast the motor synchronization pulse. LLDI 10 defines universal messages which can be asynchronously transmitted at any time including within and between data information transfer phases. Messages are used for bus management functions and for the notification of asynchronous events. Messages are transmitted by both the controller and device and do not generate a response or no handshake is required. One of the universal messages is Motor Sync.

LLDI 10 allows data blocks to span sector servo bursts transparently to the controller. LLDI 10 defines one 'I' type (Initial) and multiple 'S' type (Subsequent) data blocks per logical sector. The 'I' block is optional. Both 'I' and 'S' block lengths are programmable. The controller can define logical sector formats and block sizes which are optimized for a specific application. One application is a single field containing both the ID and the data. Another application is a RAID 5 array where a logical data block is divided between multiple parallel devices and small block sizes are required.

Device error handling by LLDI 10 includes detecting an error, terminating any interface operation and sending an attention message and waiting for the controller. LLDI 10 initiates no error recovery; the controller recovers the error attention message information and clears the error condition. Implementation of zone recording requires the device to re-orient the block and byte counters to the rotational position when seeking between zones. LLDI 10 optionally defines an Address mark which allows the device to locate an ID field for zone recording.

In order to minimize device logic, high level functions are provided by the controller 12. Functions provided by the controller 12 include data buffer logical to physical block conversion, format, defect management, ID generation and error checking and correction (ECC) functions.

As a result of the minimum hardware or function of the LLDI 10, the failure rate or mean time between failures (MTBF) of the LLDI is improved. Also by providing the lowest common denominator device function, the LLDI 10 can enjoy a wide range of applications in which subsystem features are implemented in the controller.

Among its major components, LLDI 10 includes a single microprocessor 40 and an associated microprocessor command hardware or function 42 and three hardware state machines or read data function 44, write data function 46, and request status function 48. Microprocessor 40 can be implemented with a low performance level device, for example, a TMS-320 microprocessor as illustrated in FIG. 8 can be used. The read, write and status hardware state machines 44, 46 and 48 are analogous to a formatter chip interface found buried within an ESDI device. The read, write and status hardware state machines 44, 46 and 48 operate independently and at high speed to support the data rates and polling requirements provided by the LLDI 10.

Microprocessor 40 supports servo control 50, motor control 52 and interface control for data channel 54, and status 58. All interface control 54, 56 and 58 is non-time critical and the amount of microcode required is small. Data and commands are coupled to the microprocessor command, read data, write data and request status functions 42, 44, 46 and 48 through a non-MESSAGE passthru block 60. Controller messages are decoded by a motor sync message block 62, a bus reset message block 64, a selection message block 66 and an abort message block 68. Messages transmitted by the controller can be transmitted at any time and are immediately executed by the LLDI 10 and produces no message response, pacing or handshake. As information novets are received, the non-MESSAGE passthru block 60 will effectively block any messages from being received by the microprocessor command, read data, write data, and request status functions so that messages may be transparently inserted within a command phase, a data in phase of a read command, and a data out phase of a write command. A novet is a nine-bit character.

The motor sync message block receives the motor sync message sent by the controller to provide the timing needed for motor synchronization with the device. Universal messages are received by all the devices on the bus and the motor sync message is ignored if motor synchronization is not supported by the device. The synchronization point is defined relative to device index with a set motor speed command by LLDI 10. Upon receiving messages, the device takes action to minimize the time difference between the receipt of the message and performing the requested feature. The bus reset message block 64 receives the bus reset universal message from the controller to cause all bus devices to perform a reset operation. The selection message (M-SE1) is a universal message indicating the start of the selection phase. The selection message is followed by function-address (FA) pair and optional data novets containing command and/or data. The abort message block 68 allows the controller to gracefully terminate the data transfer associated with a read command.

Messages sent by the device to the controller include a sync in message, attention message and header I/S messages at message block 70 in FIG. 3. The sync in message acknowledges the reception of each data novet transmitted by the controller and limits the rate at which data novets are transmitted by the controller. The attention message is sent in place of a sync in message or a data novet to indicate that an error has occurred and that the device has terminated the command. The header messages identify the start of the header which may be optionally transferred during the read command. The header message contains the physical block number of the block which is about to be transferred to the controller. The header serves to identify block boundaries for a multi-block read. It also serves to identify the type of block being transferred. The header information allows controller hardware to direct the transferred data bytes to appropriate buffer locations and to allow the controller to rotationally synchronize to the drive.

Burst data transfer mode is used when the receiver can process the transmitted data in real time. Paced mode is used when the receiver cannot keep up with the transmitter and must therefore throttle down the transfer rate. Paced mode is used during all data out phases, such as a data out phase of the write command and the microprocessor function command phase. Burst data transfer is used for all message phases and during the selection phase, the data in phases, such as the data in phase of the read command, and the hardware function command phase.

The read ID compare command causes the device to read and transfer the requested data from the media to the controller. The read ID command transfers data in real time from the media and is implemented by read data function 44. Implicit with the read ID compare command is the correspondence of a single data field with each ID field; each data block has a unique ID by which it may be identified. Prior to transmitting the data to the controller, any sync and gap bytes associated with the data block when it was written to the media are removed. For each data block, the device calculates and sends a two-byte CRC to verify the integrity of the transmission link between the device read channel and the controller data buffer and is not intended to replace controller ECC functions.

The read physical command causes the device to read and transfer the requested data from the media to the controller. The read physical command transfers data in real time and is implemented by read data function 44. The physical block addressing feature allows the controller to issue the read physical command at any time without maintaining rotational synchronization to the device.

The write physical command causes the device to transfer the requested data from the controller and write it on the media. The write physical command transfers data in real time to the media and is therefore implemented in function block 46. The physical block addressing feature allows the controller to issue the write physical command at any time without maintaining rotational synchronization to the device. The write physical command does not support any immediate start mode. In the addressed start mode, the write operation begins when the device encounters the physical block specified in the address field. The device shall continue to transfer data blocks of the specified type until the total number of blocks transferred is equal to the number specified in a defined count field.

The request status command requests that the device send the current contents of the status byte to the controller. The status byte contains information indicating the current state of the physical device hardware so that the value is continuously changing as device state changes occur. The request status command is a high-speed command implemented in block 48 which allows the controller to quickly obtain the current status of the device.

Figure 4:
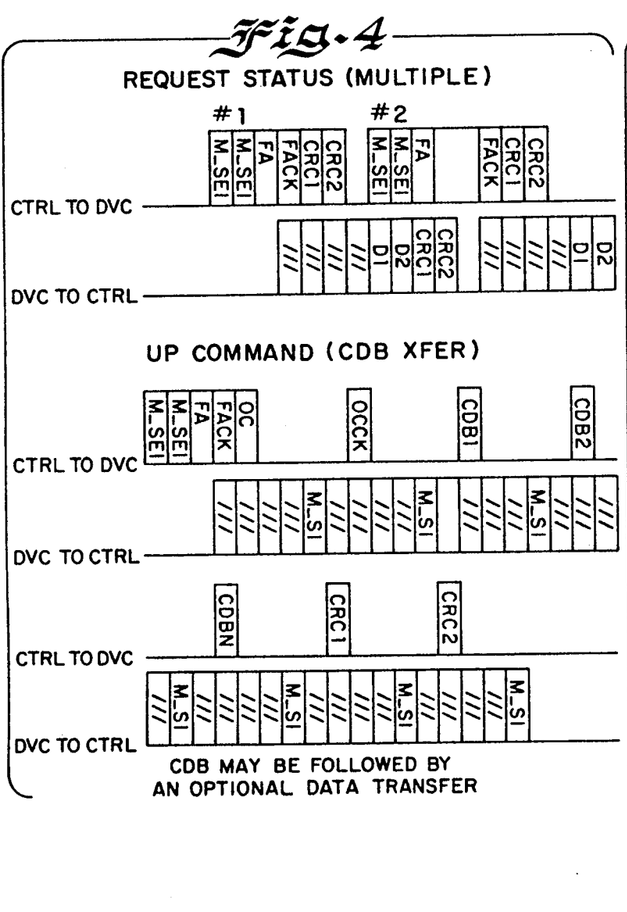
FIGS. 4, 5, 6 and 7 are charts illustrating bus activity examples according to controller/device interfacing method of the present invention.
Figure 5:
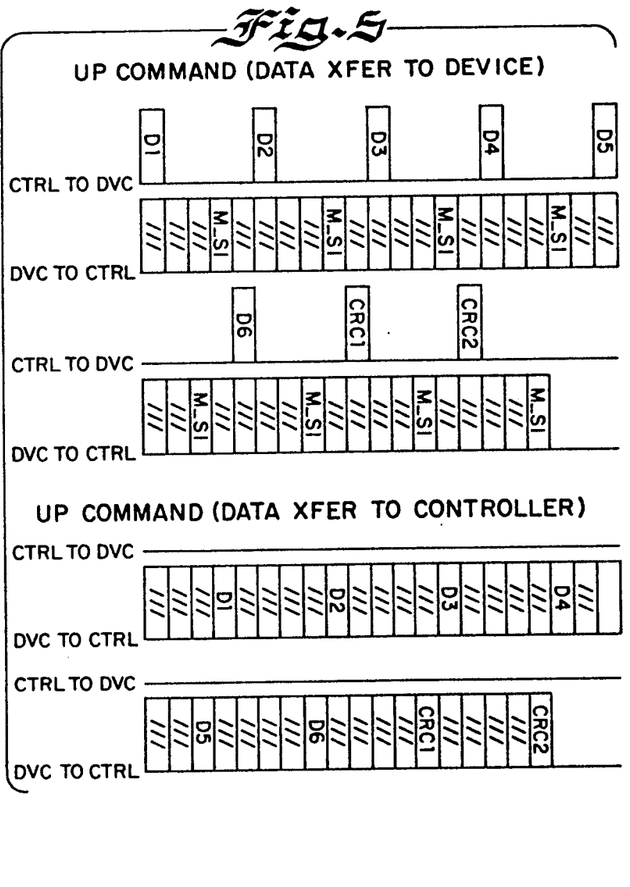
Figure 6:
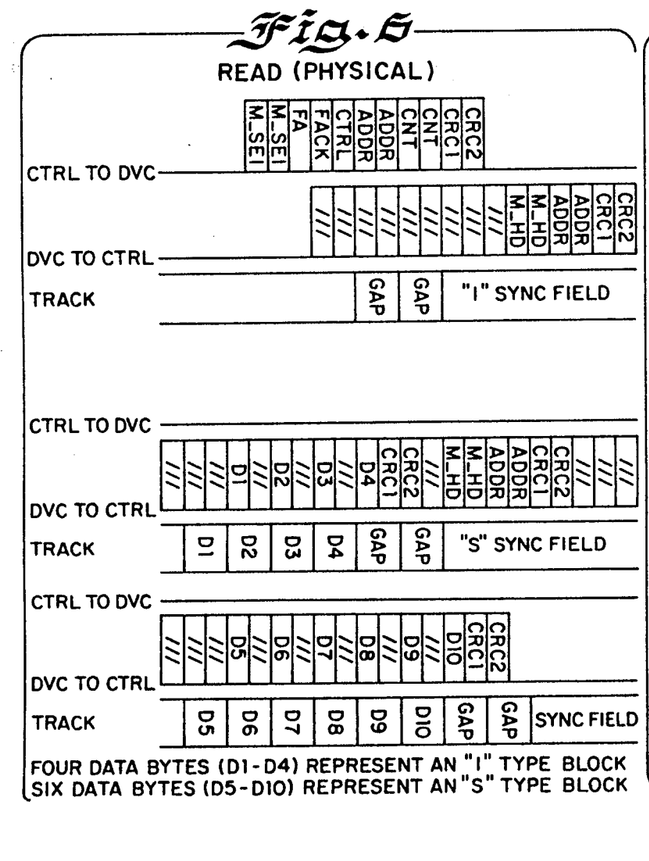
Figure 7:
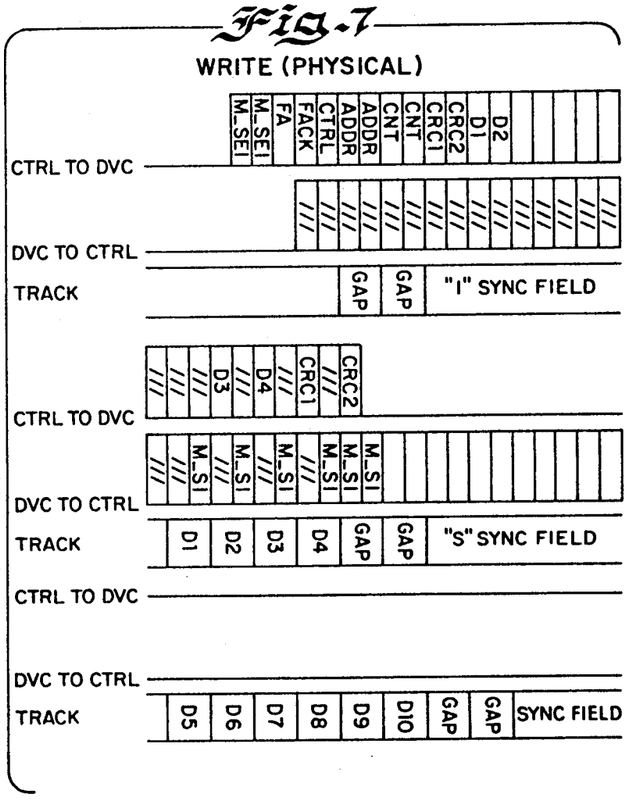
Figure 9:
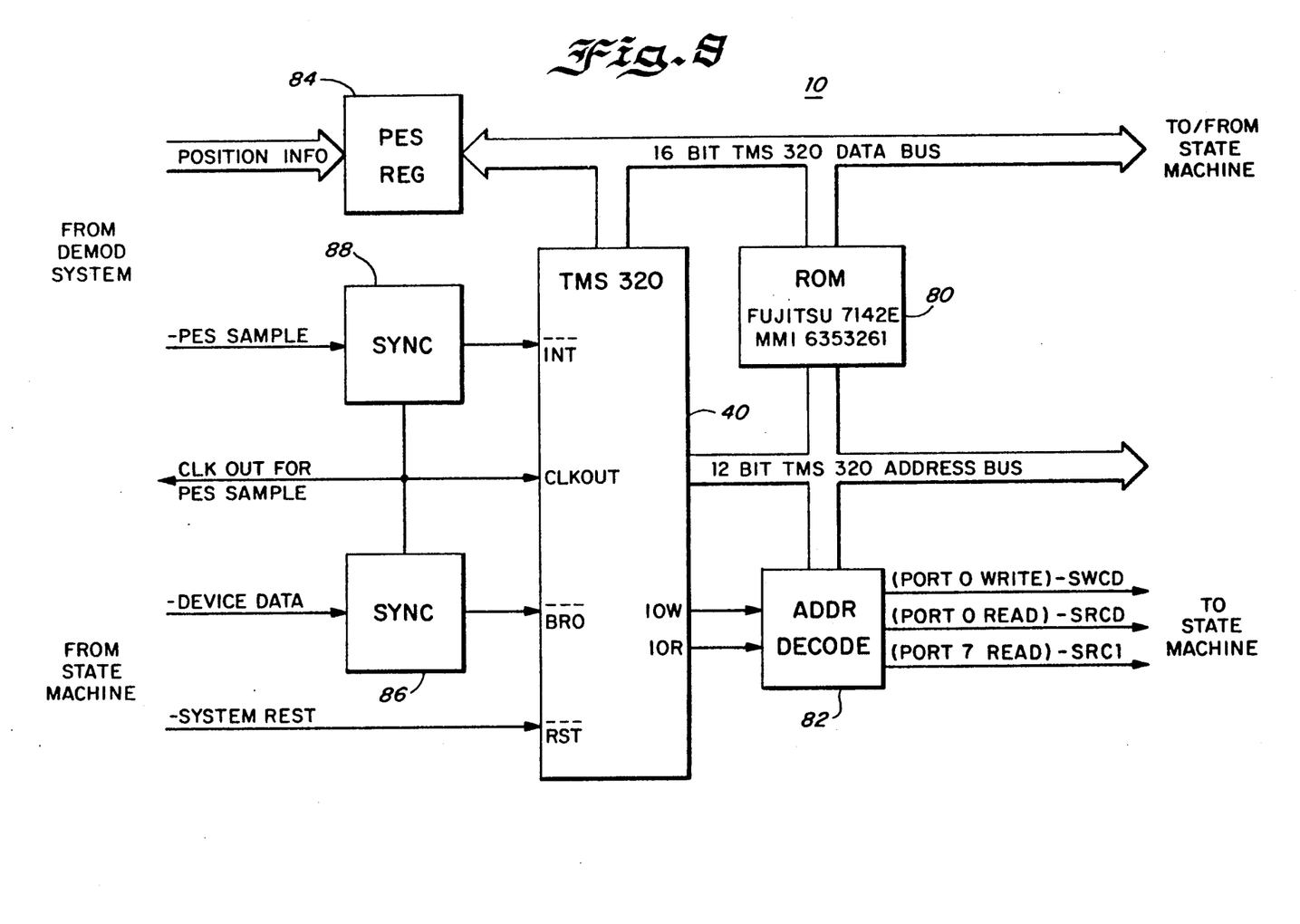

FIGS. 4, 5, 6 and 7 are charts illustrating bus activity examples according to controller/device interfacing methods of the present invention. FIG. 4 illustrates request status command with overlap of a first device data transfer with the start of a second device selection and microprocessor command descriptor block (CDB) transfer. FIG. 5 illustrates microprocessor command for data transfer to the device 14 and to the controller 12. FIG. 6 illustrates physical read and FIG. 7 illustrates physical write.

FIG. 8 illustrates exemplary microprocessor function hardware of the low level device interface LLDI 10 of FIG. 3 in relation to the three state machines. A read only memory (ROM) 80 storing predetermined parameter data is coupled to the microprocessor 40 via a 12 bit TMS320 address buss and a 16 bit TMS320 data buss. An address decoder 82 provides port O read and write signals and port 7 read signals. Position information is coupled to the microprocessor 40 via a position error signal (PES) register 84. Device data and PES sample data is coupled to the microprocessor 40 via a pair of synchronizers 86 and 88.

In summary, LLDI 10 combines features which allow a single device to support many applications. LLDI 10 addresses the packaging limitations of small form factor devices. LLDI 10 allows flexibility in device formatting and block size in order to support many applications. LLDI 10 requires a minimum amount of hardware and does not penalize the cost-sensitive applications. Because LLDI 10 is defined at the logical and protocol level to support serialization data rate performance, for example, of 10 MByte/sec, higher data rates resulting from the new optical technologies can be achieved.

What is claimed and desired to be secured by letters patent of the United States is:

1. A low level device interface (LLDI) including minimum functions used between at least one controller and a plurality of devices in a direct access storage device, said LLDI comprising:

interface means including only a two-wire serial input means and a two-wire serial output means coupled to said controller and said plurality of devices for receiving and for transmitting message information and data information to and between the controller and at least one device in the direct access storage device;

high speed read logic data function means coupled to said two-wire serial interface means responsive to a received predetermined read data information from the controller for reading and transmitting the requested data from a device to the controller in the direct access storage device;

high speed write logic data function means coupled to said interface means and responsive to a received predetermined write data information from the controller for transferring and writing the received data from the controller to a device in the direct access storage device; and means coupled between said interface means and said high speed read and write logic data function means for blocking received message information from received data information, and said message information being transmitted within sand between data information transmissions, said message information being transmitted by both the controller and the devices and said message information being generated by a microprocessor in the LLDI and said message information including a predetermined control bit within each data byte indicating message information, said predetermined control bit identified by said received message information blocking means for blocking received message information from received data information.

2. A low level device interface as recited in claim 1 wherein said data information received and transmitted by said interface means includes a plurality of predetermined commands transmitted by the controller to the plurality of devices.

3. A low level device interface as recited in claim 2 wherein said plurality of predetermined commands include high performance write data, read data and request status commands transmitted by the controller to the plurality of devices.

4. A low level device interface as recited in claim 3 wherein said plurality of predetermined commands transmitted by the controller to the plurality of devices further include a plurality of low performance microprocessor commands.

5. A low level device interface as recited in claim 4 wherein said microprocessor commands transmitted by the controller include servo control, motor control and interface control commands.

6. A low level device interface as recited in claim 1 further including microprocessor means coupled to said interface means for performing low 7. A low level device interface as recited in claim 1 further comprising high speed request status logic function means coupled to said interface means and responsive to a received predetermined request status data information from the controller for transmitting the requested status data to the controller from the high speed request status logic function means in the LLDI.

8. A low level device interface as recited in claim 7 wherein said high speed read logic data, write logic data and request status logic functions are performed by hardware state machines.

9. A low level device interface as recited in claim 1 further comprising means responsive to a received predetermined address data information from the controller for defining physical block addressing.

10. A low level device interface as recited in claim 1 further comprising means responsive to a received predetermined address data information from the controller for defining controlled selected data block formats and controlled selected block sizes.

11. A controller/device interfacing method for transferring information between a controller and a plurality of devices with a two-wire serial low level device interface (LLDI) in a direct access storage device, said method performed by the LLDI comprising the steps of:

receiving and transmitting serialized message and data information between the controller and the devices in the direct access storage device;

providing read data function hardware for transmitting requested data from a device to the controller in the direct access storage device responsive to a received predetermined read data information from the controller;

providing write data function hardware for writing the received data from the controller to a device in the direct access storage device responsive to a received predetermined write data information from the controller;

providing a non-message passthru block for identifying a predetermined control bit in each information byte and blocking received message information from received data information responsive to an identified predetermined control bit; and asynchronously transmitting message information to the controller and to at least one device, said message information being asynchronously transmitted at any time including within and between data information transfers.

* * * * *

UNITED STATES PATENT AND TRADEMARK OFFICE
CERTIFICATE OF CORRECTION

PATENT NO. : 5,313,589

DATED : May 17, 1994

INVENTOR(S) : Donaldson et al.

It is certified that error appears in the above-identified patent and that said Letters Patent is hereby corrected as shown below:

At column 7, claim 1, line 55, "sand" should be changed to --and--; and at column 8, claim 6, line 19, the phrase --performance microprocessor commands transmitted by the controller.-- should be inserted after "low".

Signed and Sealed this

Sixteenth Day of August, 1994

*Attest:*

BRUCE LEHMAN

*Attesting Officer*    Commissioner of Patents and Trademarks